US007083488B2

(12) United States Patent
Taniguchi et al.

(10) Patent No.: US 7,083,488 B2
(45) Date of Patent: Aug. 1, 2006

(54) METHOD FOR MANUFACTURING SPARK PLUG AND APPARATUS FOR MANUFACTURING SPARK PLUG

(75) Inventors: Yutaka Taniguchi, Aichi (JP); Masahide Sumi, Gifu (JP)

(73) Assignee: NGK Spark Plug Co., Ltd., Aichi (JP)

( * ) Notice: Subject to any disclaimer, the term of this patent is extended or adjusted under 35 U.S.C. 154(b) by 63 days.

(21) Appl. No.: 10/400,535

(22) Filed: Mar. 28, 2003

(65) Prior Publication Data

US 2004/0192155 A1 Sep. 30, 2004

(51) Int. Cl.
*H01T 21/02* (2006.01)
*H01T 21/00* (2006.01)
*B23K 26/00* (2006.01)

(52) U.S. Cl. ................ 445/7; 219/121.63; 219/121.64; 219/121.6

(58) Field of Classification Search .................... 445/4, 445/7, 64, 60; 313/141, 144, 118; 219/121.63, 219/121.64, 121.6
See application file for complete search history.

(56) References Cited

U.S. PATENT DOCUMENTS 5,273,474 A * 12/1993 Oshima et al. ................ 445/7
5,320,569 A 6/1994 Oshima et al.
5,607,605 A * 3/1997 Musasa et al. ......... 219/121.64
6,078,129 A * 6/2000 Gotou et al. ................ 313/141
6,193,575 B1 * 2/2001 Nakatani ........................ 445/4
6,595,818 B1 * 7/2003 Uehara ........................... 445/7
6,891,318 B1 * 5/2005 Hori et al. .................. 313/141

FOREIGN PATENT DOCUMENTS

EP 1 049 222 B1 7/2002
JP 06-045050 2/1994
JP 10-112374 4/1998
JP 2001-015245 1/2001

* cited by examiner

*Primary Examiner*—Mariceli Santiago
(74) *Attorney, Agent, or Firm*—Lowe Hauptman & Berner, LLP

(57) ABSTRACT

A method and apparatus for manufacturing a spark plug which avoids depth insufficiency of the weld metal portion or thickness insufficiency of the spark portion and which thus enhances the weld strength and service life of the spark portion. According to the method, a noble metal chip is attached to a chip joint face formed on a distal end of a center electrode of a spark plug workpiece, along the direction of the longitudinal axis of the workpiece, so as to form a chip-attached assembly. The chip-attached assembly is irradiated with a laser beam LB so as to form a laser-beam weld metal portion intruding into the noble metal chip and into the chip joint face, thereby forming a noble-metal spark portion having a discharge face. The position of the chip joint face of the center electrode as viewed along the direction of the longitudinal axis is detected, and on the basis of the detected position, the position of irradiation with the laser beam on the chip-attached assembly along the direction of the longitudinal axis is adjusted.

9 Claims, 11 Drawing Sheets

$$x N_C \quad (1-x)\ N_E = N_{CW} : N_{EW} \quad \cdots(1)$$

$$x = \frac{N_E \cdot N_{CW}}{N_E \cdot N_{CW} + N_C \cdot N_{EW}} \quad \cdots(2)$$

VOLUME OF WELD METAL PORTION : $V_t = \sum_{i=1}^{k} S_i \Delta Z$ · · · (3)

MELT VOLUME OF CHIP : $V_c = \frac{x/\rho_c}{x/\rho_c + (1-x)/\rho_E} V_t$ · · · (4)

MELT VOLUME OF ELECTRODE : $V_E = \frac{(1-x)/\rho_E}{x/\rho_c + (1-x)/\rho_E} V_t$ · · · (5)

VOLUME OF RECESS : $V_r = \sum_{i=1}^{j} S_i' \Delta Z$ · · · (6)

PRESUMED CHIP VOLUME $V_m = \frac{1}{4}\pi D^2 + V_r + V_c$ · · · (7)

PRESUMED CHIP HEIGHT $H = \frac{4V_m}{\pi D^2}$ · · · (8)

METHOD FOR MANUFACTURING SPARK PLUG AND APPARATUS FOR MANUFACTURING SPARK PLUG

BACKGROUND OF THE INVENTION

1. Field of the Invention

The invention relates to a method for manufacturing a spark plug and to an apparatus for manufacturing a spark plug.

2. Description of Related Art

Recently, in order to enhance spark ablation resistance of a spark plug used for providing ignition in an internal combustion engine, a certain type of spark plug has employed a noble-metal spark portion formed by welding a noble metal chip predominantly containing Pt, Ir, or the like, to a distal end of a center electrode formed from an Ni- or Fe-based heat-resistant alloy. For example, to join a noble-metal chip to the distal end face of a center electrode so as to form a spark discharge gap in cooperation with an opposed ground electrode, a full-circled laser-beam welding method has been proposed (as disclosed in, for example, Japanese Laid-Open Patent Applications Nos. H06-45050 and H10-112374). According to the method, a disk-like noble metal chip is attached to the distal end face (a chip joint face) of the center electrode, and the boundary between the chip and the electrode is irradiated with a laser beam while the center electrode is being rotated, thereby forming a full-circled laser-beam weld metal portion.

The above-mentioned method for manufacturing a spark plug employs a pulsed laser beam emitted from a YAG laser or the like for forming a laser-beam weld metal portion along the circumference of the noble metal chip in such a manner as to intrude into the noble metal chip and into a chip joint face formation portion of the center electrode. However, since a melting point difference of about hundreds of ° C. to 1,000° C. exists between the chip material (a noble metal such as Pt or Ir or a noble metal alloy predominantly containing the same) and the electrode material (an Ni- or Fe-based alloy), a slight variation in welding conditions leads to insufficient fusion of a noble metal or noble metal alloy or excessive fusion of an electrode alloy, resulting in a failure to form a sound weld metal portion. Also, when spark plugs of different spark-portion specifications such as different materials for a noble metal chip or center electrode are to be manufactured in the same production line, the difference in spark-portion specifications is apt to greatly influence the quality of weld metal portions.

For example, when the depth of the weld metal portion becomes insufficient as a result of a variation in welding conditions, the weld strength between the center electrode and the noble metal chip is impaired, and thus the separation resistance of a formed spark portion is impaired. Also, when the width of the weld metal portion as measured along the thickness direction of the chip is increased excessively or when the position of the weld metal portion is biased toward the discharge face, the shortest distance as measured along the axial direction of the center electrode between the chip discharge face and the end edge of the weld metal portion, i.e., the spark portion thickness, becomes insufficient. As a result, even slight ablation of the spark portion involves exposure of the weld metal portion at the discharge face, thereby directly shortening service life.

SUMMARY OF THE INVENTION

It is therefore an object of the invention to provide a method and an apparatus for manufacturing a spark plug which avoid depth insufficiency of the weld metal portion and thickness insufficiency of the spark portion, and which thus enhances the weld strength and service life of the spark portion.

It is a further object of the invention to provide a high-performance spark plug manufactured by the method and apparatus.

To achieve these and other objects, the invention is directed to a method for manufacturing a spark plug, comprising the steps of attaching a noble metal chip to a chip joint face formed on a distal end of a center electrode of a spark plug workpiece, as viewed along the direction of the axis of the center electrode, so as to form a chip-attached assembly, and irradiating the chip-attached assembly with a laser beam so as to form a laser-beam weld metal portion intruding into the noble metal chip and into a chip joint face formation portion of the center electrode, thereby forming a noble-metal spark portion having a discharge face.

The method is characterized in that the position of the chip joint face of the center electrode as viewed along the axial direction is detected, and, on the basis of the detected position, the position of irradiation with the laser beam on the chip-attached assembly as viewed along the axial direction is adjusted.

The invention also provides an apparatus for manufacturing a spark plug, comprising:

a laser beam irradiation unit for irradiating a chip-attached assembly with a laser beam, the chip-attached assembly comprising a center electrode and a noble metal chip attached to a chip joint face of the center electrode, so as to form a laser-beam weld metal portion intruding into the noble metal chip and into a chip joint face formation portion of the center electrode;

a position detection means for detecting the position of the chip joint face as viewed along the direction of the attachment; and an irradiation position adjustment mechanism for adjusting, on the basis of the detected position of the chip joint face, the position of irradiation with the laser beam on the chip-attached assembly as viewed along the axial direction.

The inventors have carried out extensive studies, and as a result have found that, when laser beam welding is employed for forming a full-circled weld metal portion that joins a noble metal chip to a center electrode, a variation in the position of irradiation with a laser beam causes the depth insufficiency of a weld metal portion or the thickness insufficiency of a spark portion. After carrying out further studies, the inventors found that control of the position of irradiation with a laser beam relative to the chip joint face as viewed along the axial direction of the center electrode is effective for solving the above-mentioned problems. Specifically, the position of the chip joint face of the center electrode as viewed along the axial direction of the center electrode is detected, and, on the basis of the detected position, the position of irradiation with the laser beam on the chip-attached assembly as viewed along the axial direction is adjusted; i.e., whenever the laser-beam weld metal portion is to be formed, on the basis of the detected position of the chip joint face, the position of irradiation with a laser beam is adjusted to a predetermined target position, thereby optimizing at all times the spark portion thickness and the depth of the laser-beam weld metal portion, which is formed in such a manner as to intrude into the noble metal chip and into a chip joint face formation portion of the center electrode, thereby yielding a marked effect of enhancing the separation resistance of the spark portion and extending the service life of the spark portion.

In the manufacture of spark plugs of different models, for example, spark plugs of different spark-portion specifications such as different materials for the noble metal chip or center electrode, the position of irradiation with a laser beam at which the weld metal portion depth and the spark portion thickness can be optimized is experimentally obtained beforehand for each different spark-portion specification. When the model of spark plugs to be manufactured is changed, the optimum position of irradiation with a laser beam for the different model is employed. For example, since an Ir-based noble metal chip has a melting point that is hundreds of ° C. higher than that of a Pt-based noble metal chip, when the same position of irradiation with a laser beam is employed for both noble metal chips, the Ir-based noble metal chip is less likely to be fused. Therefore, the properties of a weld metal portion to be formed differ greatly between a model employing the Pt-based noble metal chip and a model employing the Ir-based noble metal chip. For this reason, in terms of obtaining weld metal portions of uniform depth or width, the following practice is quite effective: the position of irradiation with the laser beam is adjusted according to material for the noble metal chip and/or material for the center electrode in such a manner as to establish a predetermined relative position, specific to the individual materials, between the position of irradiation and the chip joint face. Notably, when dimensional parameters, such as outside diameter and height, of the noble metal chip and electrode influence optimization of the weld metal portion depth and the spark portion thickness, preferably, the optimum positions of irradiation with a laser beam are obtained beforehand in accordance with the dimensional parameters as well as material, and in the course of manufacture, the optimum position of irradiation with a laser beam is selected from among the positions in accordance with actual specifications.

For example, when a chip joint face formation portion of the center electrode is formed predominantly from Ni or Fe, and the noble metal chip is formed predominantly from Ir, Rh, or Pt, the laser-beam weld metal portion is preferably a full-circled weld metal portion that does not reach the discharge face as viewed along the thickness direction of the noble metal chip, and d/w is adjusted to greater than 0.35, where, as viewed on a section of a noble-metal spark portion taken along the axis, d represents the depth of penetration of the full-circled laser-beam weld metal portion (hereinafter referred to as the weld metal portion depth), and w represents the width of the weld metal portion. Through adjustment of d/w to greater than 0.35, the weld metal portion width w becomes relatively small, and the weld metal portion depth d becomes relatively large, thereby increasing the area of the joint, and in turn enhancing the weld strength of the spark portion and thus the separation resistance of the spark portion. Adjusting the position of irradiation with a laser beam so as to attain a d/w greater than 0.35 leads to suppression of variations in the weld metal portion depth d and the weld metal portion width w, and spark plugs of uniform quality are obtained. However, when d/w is less than 0.35, the above-mentioned effect is diminished. In some cases, employment of an excessively large d/w may be disadvantageous in terms of formation of a homogeneous weld metal portion intruding into the noble metal chip and into the center electrode.

In order to decrease d/w, a high-energy laser beam spot must be considerably reduced in diameter. However, in actuality, a certain limit is imposed on reduction in the diameter of the laser beam spot. Thus, preferably, d/w is not greater than 1 and not less than 0.55.

When the position of irradiation with a laser beam is adjusted to a predetermined target position relative to the position of the chip joint face so as to suppress a variation in the weld metal portion width w, the spark portion thickness h can be increased accordingly, thereby suppressing a phenomenon such that ablation of the spark portion is accompanied by exposure of the full-circled laser-beam weld metal portion at the discharge face of the spark portion. Therefore, accelerated ablation of the spark portion, which would otherwise result from the exposure of the full-circled laser-beam weld metal portion, is suppressed, enhancing the durability of the spark portion. Specifically, the ratio between the spark portion thickness h and the chip thickness H, or h/H, can be readily increased to ⅓ or higher. Since substantially ⅓ or higher of the chip thickness H can serve as an effective spark portion thickness h, the service life of the spark portion is greatly extended. However, an excessively high h/H means that the weld metal portion fails to provide a sufficient joining allowance for the chip, thereby potentially leading to a drop in the joining strength of the spark portion. Therefore, preferably, the upper limit of h/H is set to about 9/10, and, more preferably, h/H is not lower than ½.

In order to attain the above-mentioned d/w ratio or h/H ratio, preferably, the full-circled laser-beam weld metal portion is formed such that the melt ratio of the metal of the noble metal chip is 40%–60% by volume. As a result, a spark plug to be provided is characterized in that:

a noble-metal spark portion having a discharge face is formed by use of a noble metal chip and by the steps of attaching the noble metal chip to a chip joint face formed on a distal end of a center electrode as viewed along the axial direction of the center electrode, and forming a laser-beam weld metal portion intruding into the noble metal chip and into a chip joint face formation portion of the center electrode;

the chip joint face formation portion of the center electrode is formed predominantly from Ni or Fe;

the noble metal chip is formed predominantly from Ir, Rh, or Pt; and the laser-beam weld metal portion is a full-circled weld metal portion that does not reach the discharge face as viewed along the thickness direction of the noble metal chip, and the melt ratio of the metal of the noble metal chip is 40%–60% by volume.

When the melt ratio of the metal of the noble metal chip is less than 40% by volume, the weld metal portion depth d is apt to become insufficient, and thus attainment of a d/w value falling within the above-mentioned preferable range becomes difficult, leading to impairment in the separation resistance of the spark portion. When the melt ratio of the metal of the noble metal chip decreases, the melt ratio of the metal of the center electrode increases, which means that the position of irradiation with a laser beam is considerably biased into the center electrode with respect to the chip joint face, and thus the weld metal portion is formed in such a manner as to be biased into the center electrode. When this tendency increases, the weld metal portion fails to provide a sufficient joining allowance for the noble metal chip, thereby potentially leading to a drop in the joining strength of the spark portion. When the above-mentioned melt ratio is in excess of 60% by volume, the amount of heat input of a laser beam must be increased in order to increase the melt ratio of the metal of the noble metal chip, which is of a high melting point, thereby leading to an excessive increase in the weld metal portion width w and thus to an insufficiency of the weld metal portion thickness h (an insufficiency of h/H). Also, an insufficiency of the weld metal portion depth d is apt to arise.

In order to adjust the melt ratio of the metal of the noble metal chip to the above-mentioned range, the chip-attached assembly must undergo adjustment of the position of irradiation with a laser beam. In other words, the position of irradiation with a laser beam is adjusted such that the melt ratio of the metal of the noble metal chip falls within the above-mentioned range. However, the preferred irradiation position varies depending on material and dimensions of the spark portion (noble metal chip) and thus cannot be specified by solely numerical range.

BREIF DESCRIPTION OF THE DRAWINGS

FIG. 1 is a vertical sectional view showing an embodiment of a spark plug of the invention, with an enlarged view showing essential portions of the spark plug;

FIGS. 2(*a*)–2(*c*) are explanatory views showing a process for manufacturing a spark portion of a center electrode of the spark plug of FIG. 1;

Figure 5:
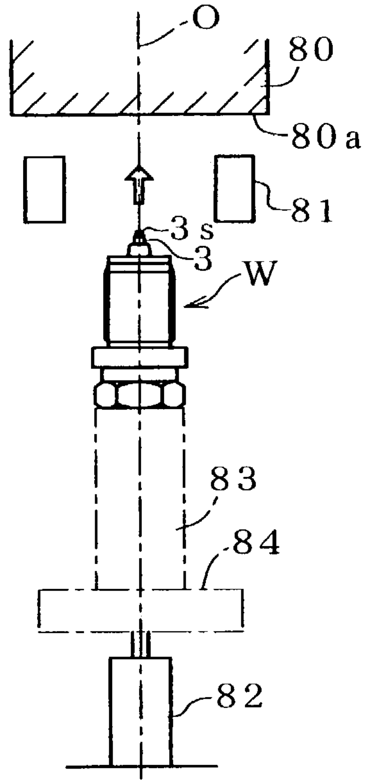
Figure 5:
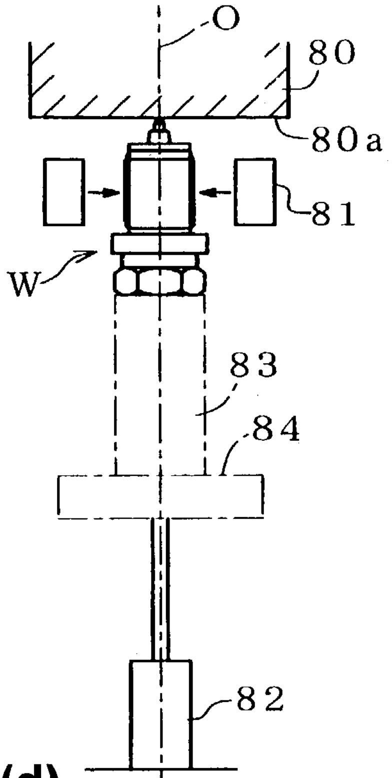
Figure 5:
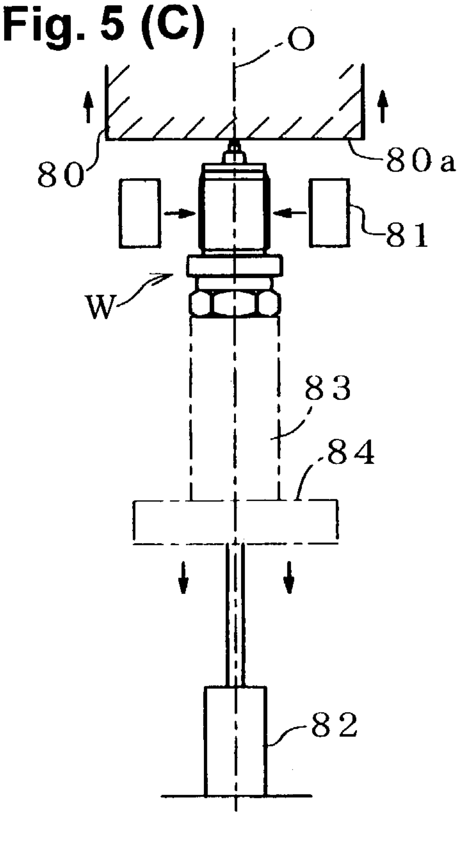
Figure 5:
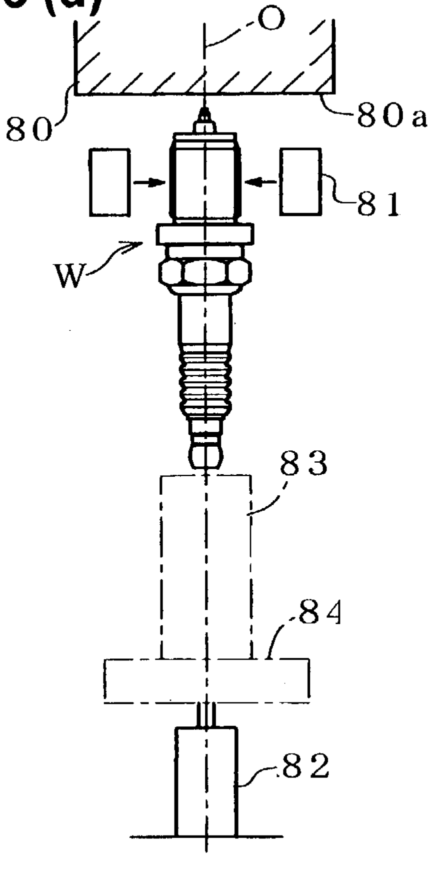
Figure 6:
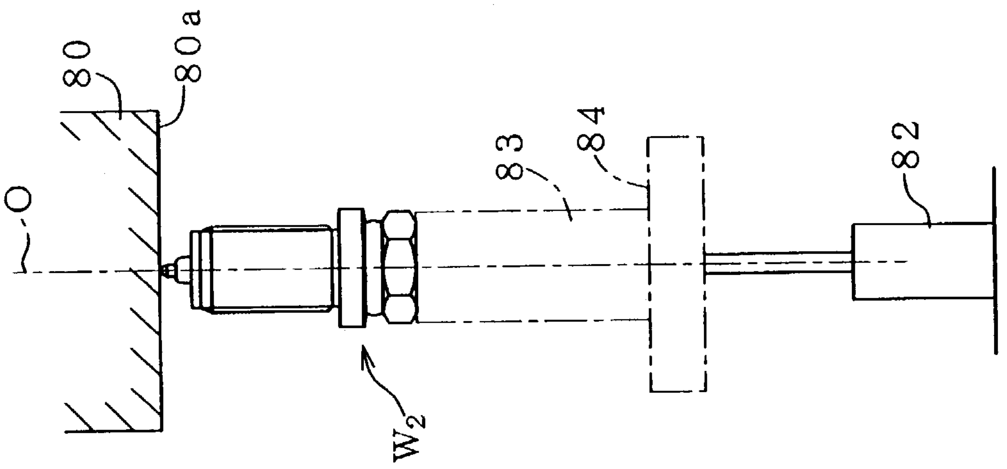
Figure 6:
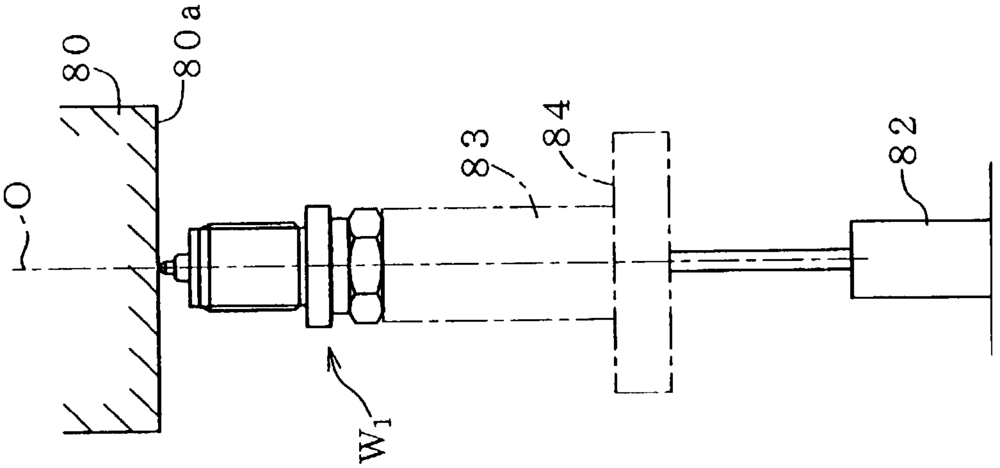
Figure 7:
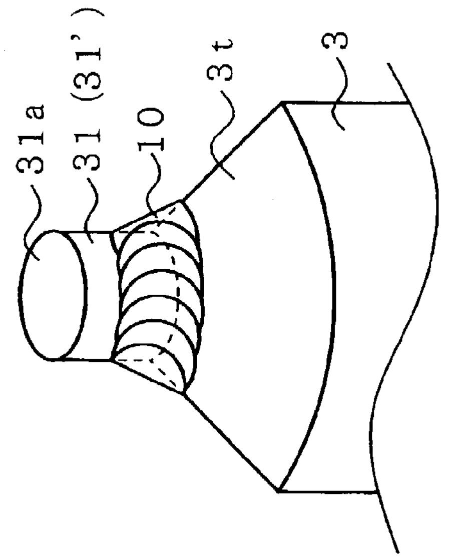
Figure 7:
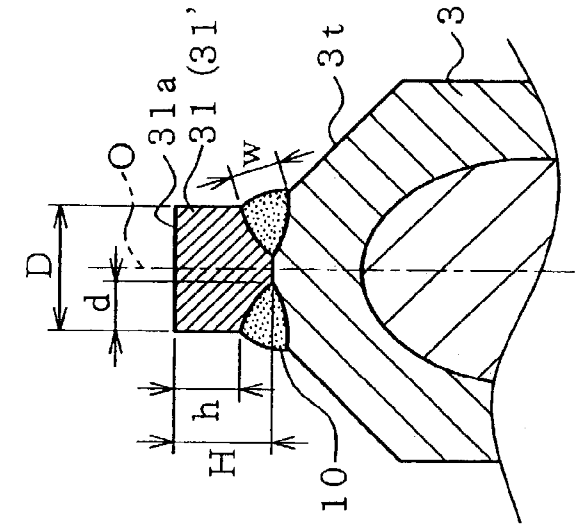
Figure 7:
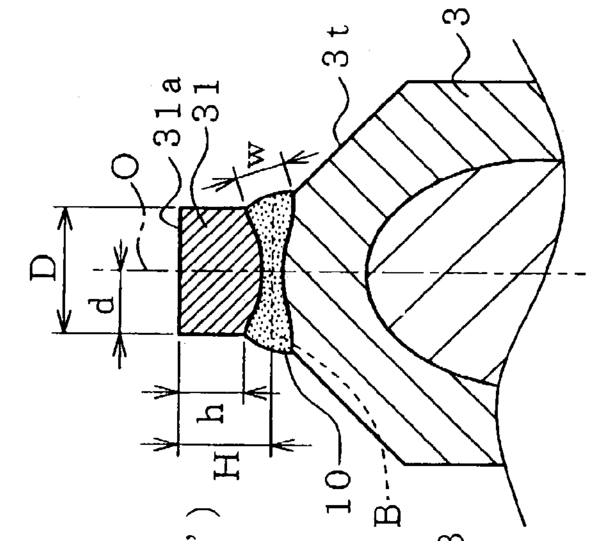
Figure 8:
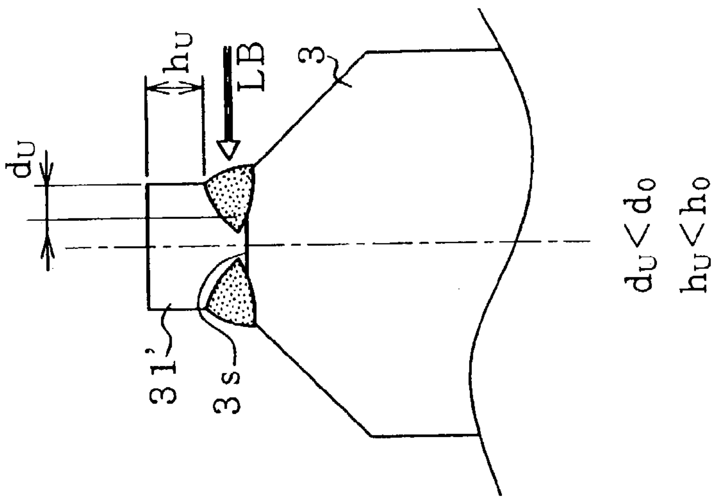
Figure 8:
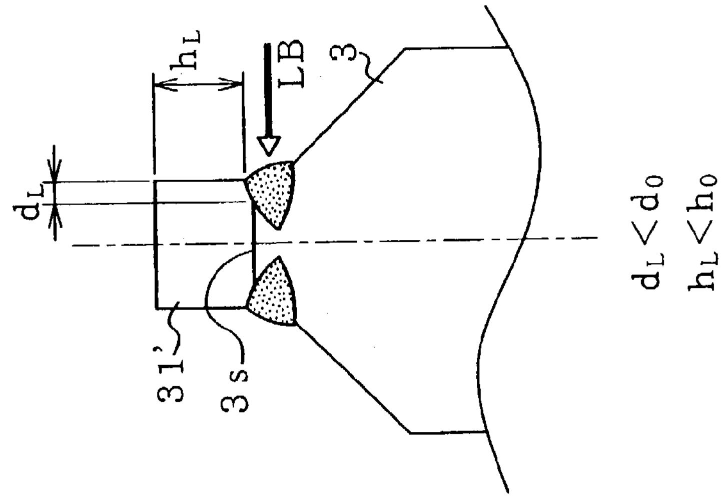
Figure 8:
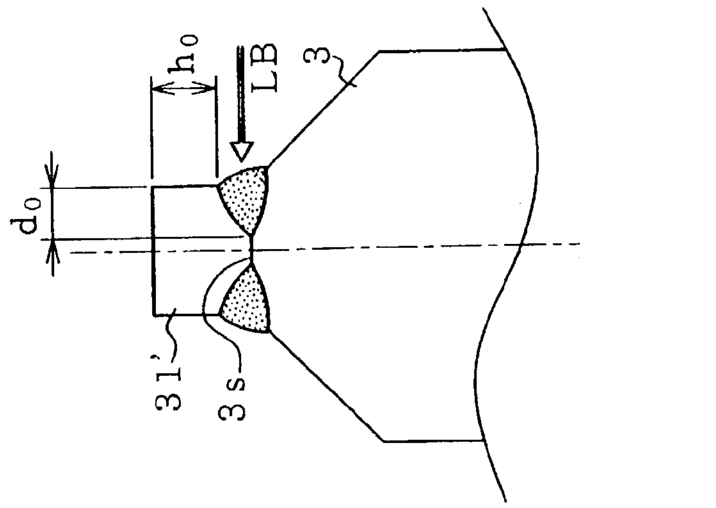
Figure 9:
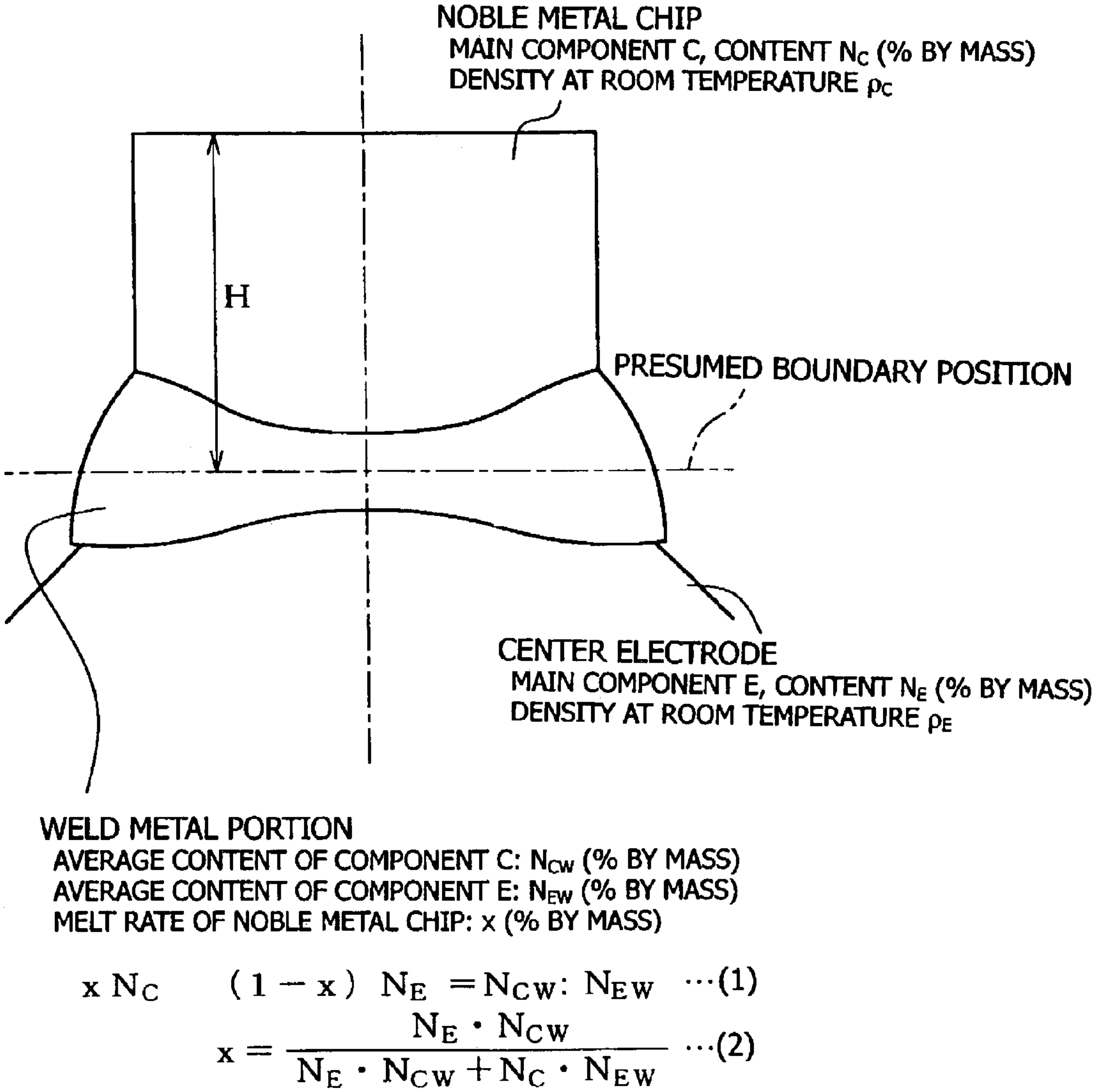
Figure 10:
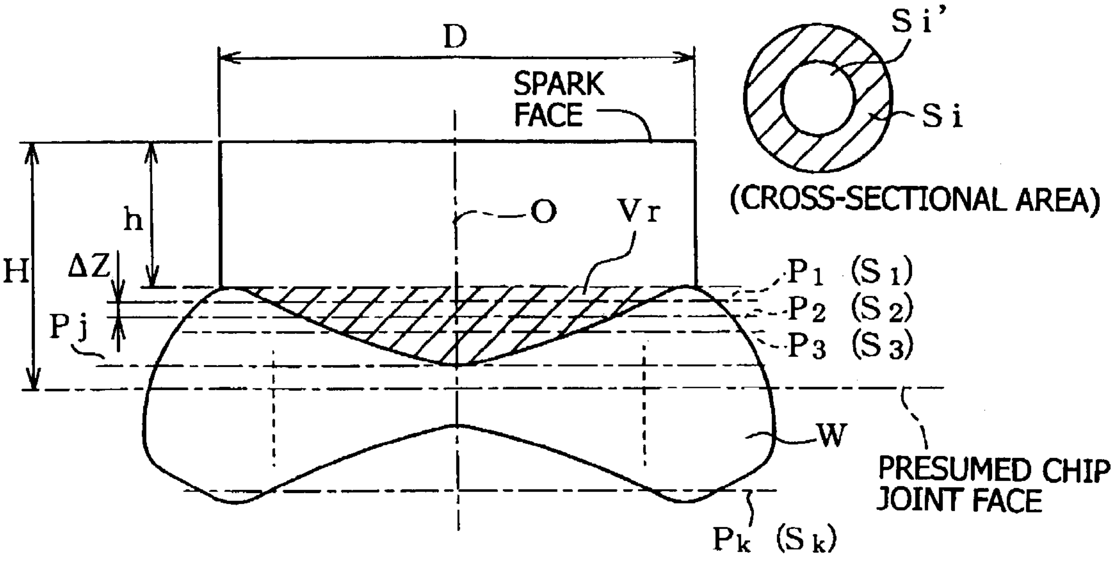
Figure 11:
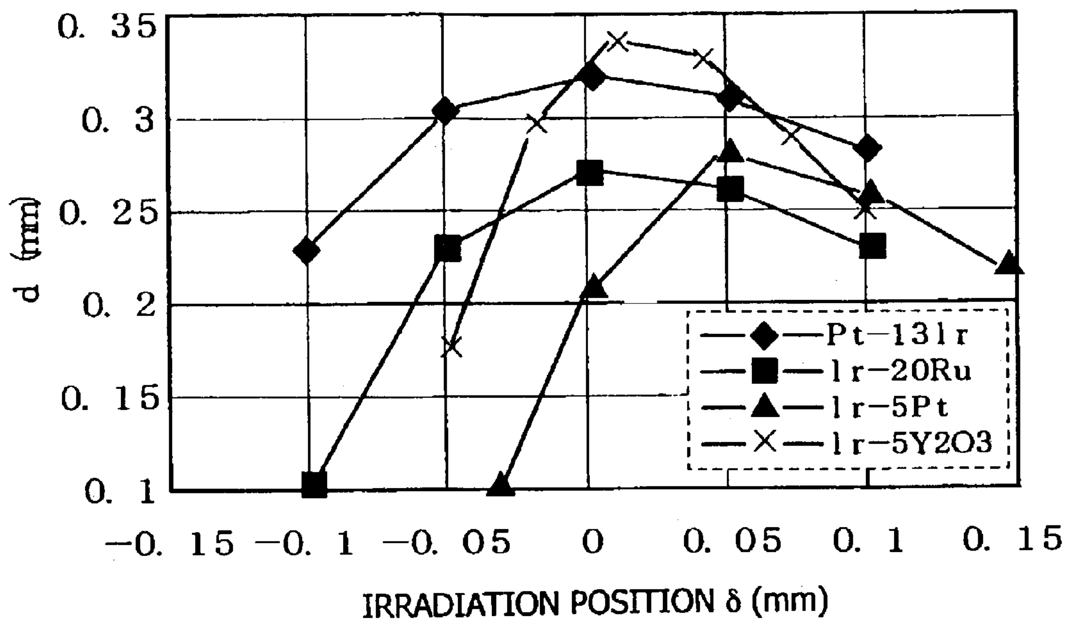
Figure 11:
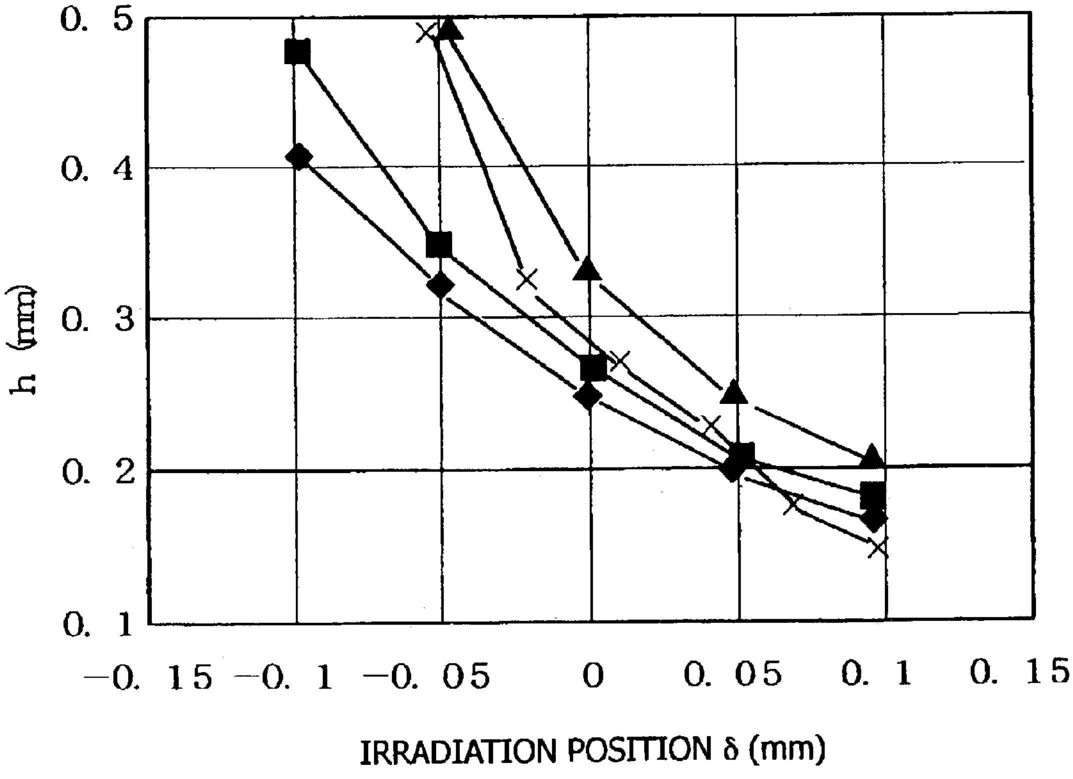

FIGS. 5(*a*)–5(*d*) are explanatory views showing an example of a process for positioning a chip joint face;

FIGS. 6(*a*)–6(*b*) are explanatory views showing the effect of the process of FIG. 5;

FIGS. 7(*a*)–7(*c*) are explanatory views showing a laser beam weld metal portion and sectional form examples of the portion;

FIGS. 8(*a*)–8(*c*) are views for explaining influence of a laser beam irradiation position on the form of a weld metal portion;

FIG. 9 is a conceptual, explanatory view showing a method for calculating the melt ratio of a noble metal chip in a weld metal portion;

FIG. 10 is a conceptual, explanatory view showing a method for calculating presumed chip height; and FIGS. 11(*a*)–11(*b*) are graphs showing the relationship of laser beam irradiation position vs. weld portion depth and spark portion thickness, respectively, obtained for different chip materials.

DESCRIPTION OF THE PREFERRED EMBODIMENTS

Figure 1:
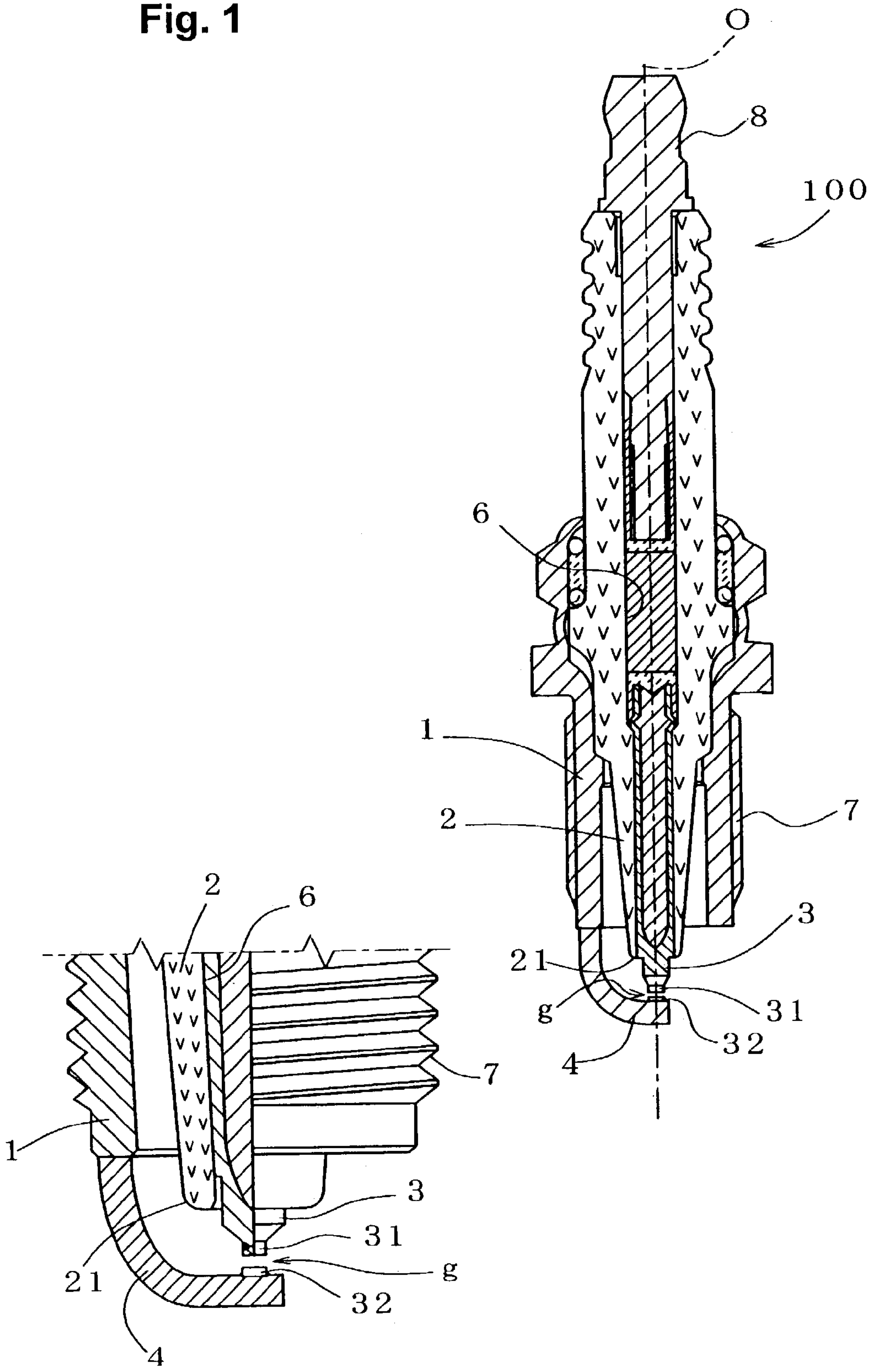

A spark plug 100 shown in FIG. 1 according to an embodiment of the invention includes a tubular metallic shell 1, an insulator 2 fitted into the metallic shell 1 such that its distal end portion 21 projects from the metallic shell 1, a center electrode 3 disposed inside the insulator 2 such that a noble-metal spark portion (hereinafter referred to as a "spark portion") 31 formed at its distal end projecting from the insulator 2, and a ground electrode 4 having one end joined to the metallic shell 1 by means of welding or a like process and another end portion bent such that the side surface thereof faces a distal end portion of the center electrode 3. A noble-metal spark portion (hereinafter referred to as a "spark portion") 32 is formed on the ground electrode 4 in such a manner as to face the spark portion 31. The gap between the opposed spark portions 31 and 32 serves as a spark discharge gap g.

Herein, the "spark portion" denotes a portion of a welded noble metal chip which is free from a change in composition induced by welding (e.g., a portion remaining after removing a portion which is alloyed with a ground electrode material or a center electrode material by welding). The term "main component" (as well as the phrase "formed predominantly from" or "predominantly containing") means that the component is contained in the material in question at the highest weight content.

The insulator 2 is formed from a ceramic sintered body, such as alumina or aluminum nitride. The insulator 2 has a hole portion 6 formed therein in such a manner as to extend along its axial direction. The center electrode 3 and a metallic terminal member 8 are fitted into the hole portion 6. The metallic shell 1 is formed into a cylindrical shape from a metal such as low-carbon steel. The metallic shell 1 serves as a housing of the spark plug 100 and has a male-threaded portion 7 formed on its outer circumferential surface. The spark plug 100 is attached to an engine block (not shown) by means of the male-threaded portion 7.

The spark portion 32 may be eliminated. In this case, the spark discharge gap g is formed between the spark portion 31 and the side surface of the ground electrode 4 not having a spark portion.

A chip joint face formation portion of the center electrode 3 and a chip joint face formation portion of the ground electrode 4 is formed from a heat-resistant alloy predominantly containing Ni or Fe, with at least its surface layer part in the present embodiment. Heat-resistant alloys which predominantly contain Ni or Fe and are usable in the present invention are shown below.

(1) Ni-based heat-resistant alloy: Used herein as a generic term for heat-resistant alloys which contain Ni in an amount of 40%–85% by mass and at least one component selected from the group consisting of Cr, Co, Mo, W, Nb, Al, Ti, and Fe, which accounts for a predominant portion of the balance. Specifically, the following alloys (mentioned by trade name; for detailed composition, refer to Metal Data Book, 3rd Edition, Maruzen, p 138) are usable: ASTROLOY, CABOT 214, D-979, HASTELLOY C22, HASTELLOY C276, HASTELLOY G30, HASTELLOY S, HASTELLOY X, HAYNES 230, INCONEL 587, INCONEL 597, INCONEL 600, INCONEL 601, INCONEL 617, INCONEL 625, INCONEL 706, INCONEL 718, INCONEL X750, KSN, -252, NIMONIC 75, NIMONIC 80A, NIMONIC 90, NIMONIC 105, NIMONIC 115, NIMONIC 263, NIMONIC 942, NIMONIC PE11, NIMONIC PE16, NIMONIC PK33, PYROMET 860, RENE 41, RENE 95, SSS 113MA, UDIMET 400, UDIMET 500, UDIMET 520, UDIMET 630, UDIMET 700, UDIMET 710, UDIMET 720, UNITEP AF2-1 DA6, WASPALOY (2) Fe-based heat-resistant alloy: Used herein as a generic term for heat-resistant alloys which contain Fe in an amount of 20%–60% by mass and at least one component selected from the group consisting of Cr, Co, Mo, W, Nb, Al, Ti, and Ni, which accounts for a predominant portion of the balance. Specifically, the following alloys (mentioned by trade name; for detailed composition, refer to Metal Data Book, 3rd Edition, Maruzen, p 138) are usable: A-286, ALLOY 901, DISCALOY, HAYNES 556, INCOLOY 800, INCOLOY 801, INCOLOY 802, INCOLOY 807, INCOLOY 825, INCOLOY 903, INCOLOY 907, INCOLOY 909, N-155, PYROMET CTX-1, PYROMET CTX-3, S-590, V-57, PYROMET CTX-1, 16-25-6, 17-14CuMo, 19-9DL, 20-Cb3

The spark portion 31 and the opposed spark portion 32 are formed predominantly from a noble metal predominantly containing Ir, Pt, or Rh. Use of these noble metals imparts good ablation resistance to the spark portion even in application to an environment in which the temperature of the center electrode is apt to increase. Also, use of these noble metals imparts good weldability to the spark portion in welding to the center electrode 3 or the ground electrode 4 whose base metal is the above-mentioned heat-resistant alloy. Examples of usable Pt-based noble metals include Pt, Pt—Ni alloys (e.g., Pt-1%–30% by mass Ni alloy), Pt—Ir alloys (e.g., Pt-1%–20% by mass Ir alloy), and Pt—Ir—Ni alloys. Examples of usable Ir-based noble metals include Ir—Ru alloys (e.g., Ir-1%–30% by mass Ru alloy), Ir—Pt alloys (e.g., Ir-1%–10% by mass Pt alloy), Ir—Rh alloys (e.g., Ir-5%–25% by mass Rh alloy), and Ir—Rh—Ni alloys (e.g., Ir-1%–40% by mass Rh-0.5%–8% by mass Ni alloy).

The Ir-based noble metal materials which can be used can contain an oxide (including a composite oxide) of a metal element belonging to Group 3A (so-called rare-earth elements) and Group 4A (Ti, Zr, and Hf) in an amount of 0.1%–15% by mass. Addition of such an oxide can effectively suppress oxidation and volatilization of an Ir component, thereby enhancing spark ablation resistance of a spark portion. Examples of such an oxide that can be used favorably include $Y_2O_3$, $La_2O_3$, $ThO_2$, and $ZrO_2$. The Ir component can be an Ir alloy or Ir.

Figure 2:
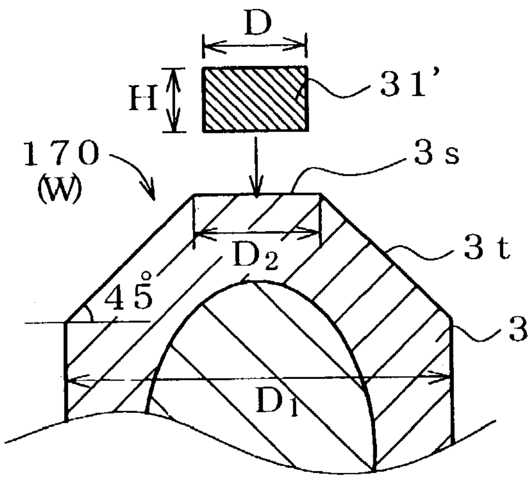
Figure 2:
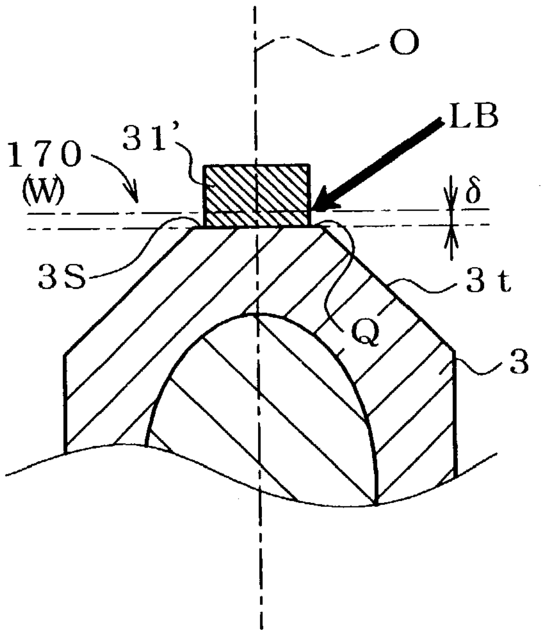
Figure 2:
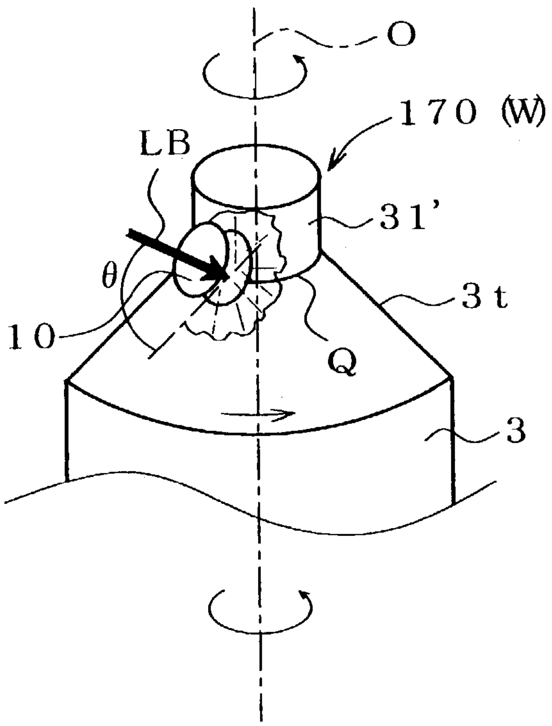

As shown in FIG. 2, a distal end portion of the center electrode 3, assuming the form of a truncated cone, reduces in diameter toward the distal end along a tapered surface 3*t*. A disk-like noble metal chip 31', which has the above-mentioned alloy composition of the spark portion 31, is attached to a distal end face 3*s* of the center electrode 3. A full-circled laser-beam weld metal portion (hereinafter referred to as a "weld metal portion") 10 is formed by means of laser beam welding along the peripheral edge of the boundary between the noble metal chip 31' and the center electrode 3, thereby joining the noble metal chip 31' to the center electrode 3 and forming the spark portion 31. The spark portion 32, which faces the spark portion 31, is formed in the following manner: a noble metal chip is positioned on the ground electrode 4 in such a manner as to be aligned with the spark portion 31, and a weld metal portion is formed similarly along the peripheral edge of the boundary between the noble metal chip and the ground electrode 4 to thereby join the noble metal chip to the ground electrode 4. When the spark portion 31 of the center electrode 3 is formed from an Ir-based metal, and the spark portion 32 of the ground electrode 4 is formed from a Pt-based metal, the spark portion 32 can be formed by means of resistance welding. The above-mentioned noble metal chip has, for example, a diameter D of 0.4–1.2 mm and a thickness H of 0.5–1.5 mm.

A method for forming the spark portion 31 of the center electrode 3 by use of laser beam welding will next be described in detail. As shown in FIG. 2(*a*), the distal end face 3*s* of the center electrode 3 serves as a chip joint face, and the noble metal chip 31' having the chip diameter D and the chip thickness H is attached to the distal end face 3*s*, thereby forming a chip-attached assembly 170 (a spark plug workpiece W). As shown in FIGS. 2(*b*) and 2(*c*), the chip-attached assembly 170 is irradiated with a laser beam LB, thereby forming the full-circled laser-beam weld metal portion 10 along the outer circumferential direction of the noble metal chip 31' in such a manner as to intrude into the noble metal chip 31' and into the chip joint face and not to reach a discharge face 31*a* (see FIG. 7) with respect to the thickness direction of the noble metal chip 31'.

The noble metal chip 31' assumes a disk-like or columnar shape. As shown in FIG. 2(*b*), while the chip-attached assembly 170 composed of the noble metal chip 31 and the center electrode 3, and an optical emission section of a laser beam irradiation unit 200 (see FIG. 3) are rotated relatively to each other about an axis O of the chip 31' (the center electrode 3), the chip-attached assembly 170 is irradiated with the pulsed laser beam LB such that the boundary edge Q between the chip joint face (in this case, the distal end face of the center electrode 3) and the outer circumferential surface of the noble metal chip 31' falls within a spot of the pulsed laser beam LB and such that the irradiation angle θ with respect to the chip joint face is −5° to +60° (the sign of an angle formed above the horizontal is +; e.g., +45°). In this case, either the chip-attached assembly 170 or the laser beam irradiation unit 200 may be rotated, or both of them may be rotated (e.g., in opposite directions).

Preferably, the rotational speed is adjusted as described below. When only a single laser beam irradiation unit 200 is used as shown in FIG. 2, the relative rotational speed between the chip-attached assembly 170 and the laser beam irradiation unit 200 is not lower than 10 rpm (preferably not lower than 60 rpm, more preferably not lower than 120 rpm). In order to perform full-circled laser beam welding, the chip-attached assembly 170 and the laser beam irradiation unit 200 must be rotated relatively to each other at least one rotation. When the relative rotational speed is lower than 10 rpm, full-circled welding time increases, thereby potentially increasing the piece time; i.e., time required for manufacturing a single spark plug. When the chip-attached assembly 170 is to be rotated, the upper limit of the relative rotational speed is preferably about 150 rpm in order to prevent deformation of a molten metal which could otherwise result from a centrifugal force induced during welding.

According to the invention, the position of the chip joint face 3*s* as viewed along the direction of the axis O of the center electrode 3 is detected, and, on the basis of the detected position, the position of irradiation with the laser beam LB on the chip-attached assembly 170 as viewed along the direction of the axis O is adjusted. Specifically, as shown in FIG. 2(*c*), in formation of the weld metal portion 10, while the detected position of the chip joint face 3*s* is used as a reference position, the position of irradiation with the laser beam LB is adjusted to the predetermined irradiation position δ (which is positive when located on the chip 31' side with respect to the chip joint face 3*s* serving as the origin, and negative when located on the center electrode 3 side) whenever welding is to be performed. As a result, as shown in FIG. 8, the depth d of the full-circled weld metal portion 10 and the spark portion thickness h are optimized at all times, thereby yielding a marked effect of enhancing the separation resistance of the spark portion 31 and extending the service life of the spark portion 31.

Figure 3:
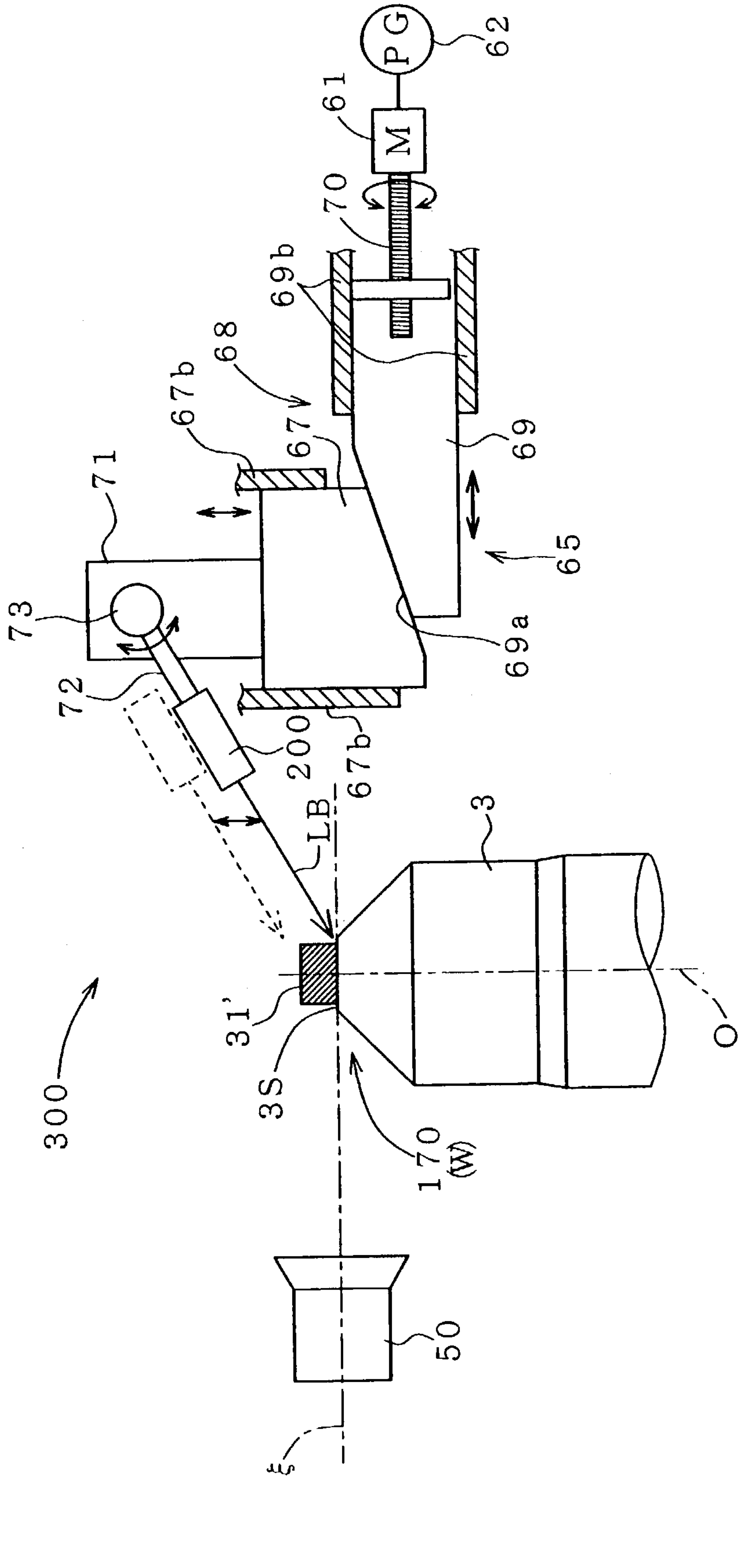
FIG. 3 is a schematic view showing an example of an apparatus for manufacturing a spark plug according to the invention.

FIG. 3 shows essential portions of a spark plug manufacturing apparatus 300 according to an embodiment of the present invention. The apparatus 300 includes an image pickup camera 50, which serves as the position detection mechanism. The camera 50 captures an image of a portion of the chip-attached assembly 170 including the chip joint face 3*s*. On the basis of the captured image, the position of the chip joint face 3*s* is determined. The detection of position through image capturing is quick and highly accurate and allows contactless detection, thereby providing an advantage in that addition of a detection step is unlikely to impair the overall efficiency of the spark plug manufacturing process.

In the present embodiment, in order to simplify the algorithm for determining the edge line of the chip joint face 3*s*, image capturing is performed by means of the camera (image pickup unit) having an optical axis ξ substantially in parallel with the chip joint face.

Alternatively, a detection method other than image capturing can be employed. For example, the position can be detected by use of a contact-type length measuring device or laser-type length measuring device in a state in which a measuring probe is in contact with or faces the chip joint face 3*s*.

Next, the position of irradiation with the laser beam LB is adjusted through relative movement of the laser beam irradiation unit 200 and the chip-attached assembly 170 in the direction of the axis O, thereby allowing simple, accurate adjustment of the position of irradiation with the laser beam LB. In this case, either the chip-attached assembly 170 or the laser beam irradiation unit 200 may be moved. However, as shown in FIG. 3, moving only the laser beam irradiation unit 200 in the direction of the axis O is convenient for process control, for the reason below. A certain portion of the chip-attached assembly 170, e.g. the chip joint face 3*s*, is used as a reference position, whereby the position of irradiation with the laser beam LB and the position of the laser beam irradiation unit 200 can be uniquely represented by use of a distance from the reference position.

According to the embodiment as shown in FIG. 3, an irradiation position adjustment mechanism 65 is adapted to move the laser beam irradiation unit 200 upward or downward along the direction of the axis O. A servomotor 61 serves as a drive unit. A torque output from the servomotor 61 is converted to a vertical drive output for vertically moving the laser beam irradiation unit 200, via a threaded shaft (including a ball screw) 70 and a conversion mechanism 68. The conversion mechanism 68 assumes the form of an inclined cam. When the threaded shaft 70 is rotated in the regular or opposite direction by means of the servomotor 61, a cam 69 screw-engaged with the threaded shaft 70 moves in a reciprocating manner along a horizontal guide 69*b*. A follower member 67 abuts an inclined cam slide surface 69*a* of the cam 69 and moves vertically along a vertical guide 67*b*. The amount of a reciprocating movement of the cam 69 is determined according to the amount of rotation of the threaded shaft 70. When the threaded shaft 70 stops rotating, the follower member 67 stops moving vertically and remains stationary at the stop position.

Being attached to the follower member 67 via a base 71, the laser beam irradiation unit 200 can remain stationary at an arbitrary position or can move upward or downward along the direction of the axis O of the chip-attached assembly 170, by means of rotation of the servomotor 61. A pulse generator (hereinafter abbreviated PG) 62, which is a rotation sensor, is connected to the servomotor 70 and is adapted to detect the angular position of the servomotor 61, i.e. the current position of the laser beam irradiation unit 200 (i.e., the position of irradiation with the laser beam LB). The laser beam irradiation unit 200 is attached to an arm 72, which, in turn, is attached to the base 71 via a pivot 73 and in such a manner as to be able to remain stationary at an arbitrary angular position. The incident angle of the laser beam LB can be adjusted through adjustment of the pivotal angle of the arm 72.

Notably, the laser beam irradiation unit can be configured such that a laser beam from a laser beam generator is once reflected by means of a reflector and then emitted toward a chip-attached assembly. In this case, the reflector can be rendered rotatable, so that the emitting direction of a reflected laser beam can be modified through adjustment of the angular position of the reflector. This configuration allows modification of the position of irradiation with a laser beam on the chip-attached assembly through adjustment of the reflector angle while the laser beam irradiation unit is rendered stationary at the current position.

Figure 4:
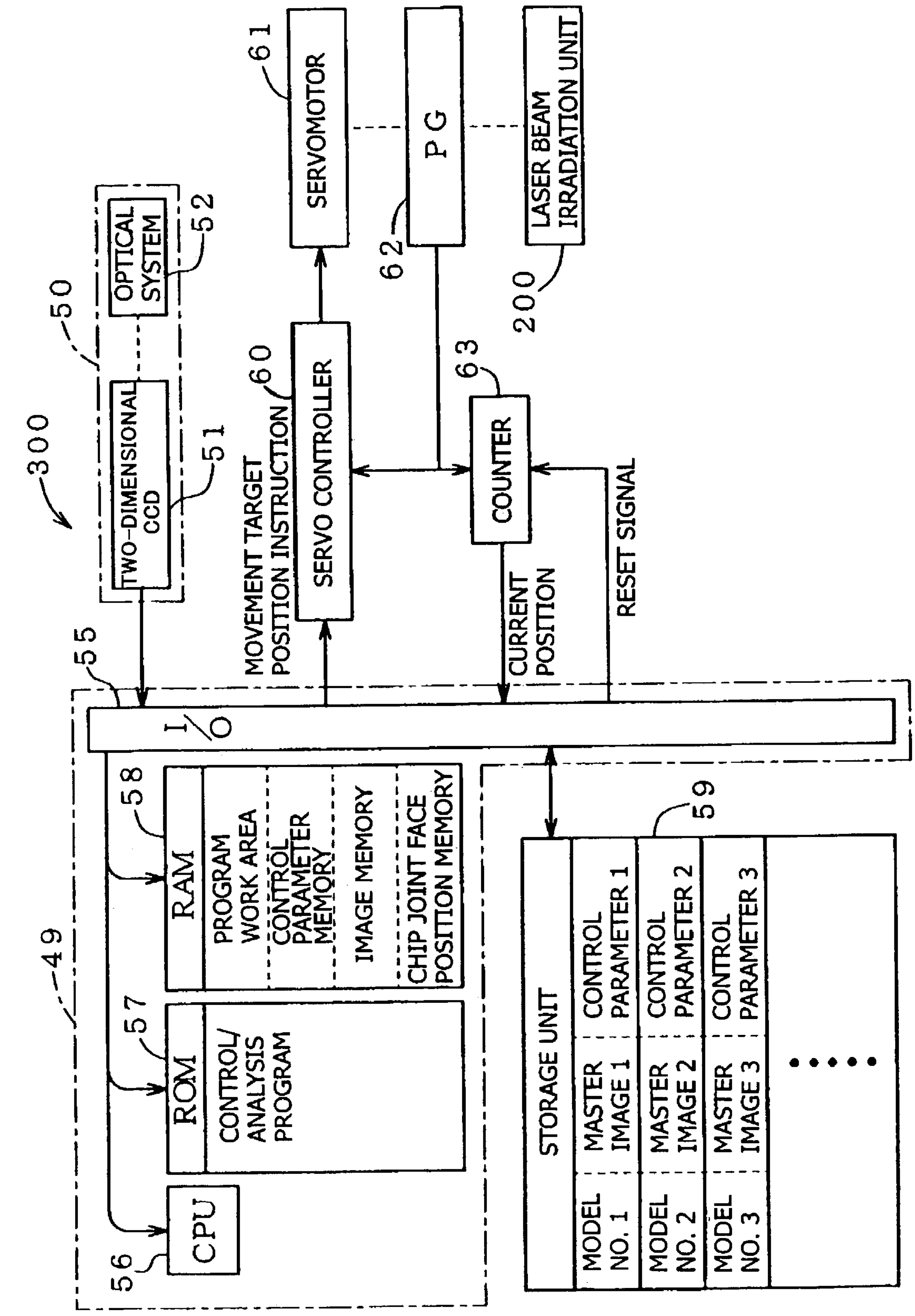
FIG. 4 is a block diagram showing an example of an electronic control means for the manufacturing apparatus of FIG. 3.

FIG. 4 shows a block diagram of an electronic control means for the spark plug manufacturing apparatus 300. A control computer 49 is a core of the electronic control means, and includes an input/output section 55, a CPU 56, a ROM 57, and a RAM 58. The input/output section 55 is connected to the CPU 56, the ROM 57, and the RAM 58. The camera 50 is a CCD camera. An image captured through an optical system 52 including a lens is converted to an image signal by means of a two-dimensional CCD sensor 51, which serves as an image sensor. The image signal is input to the computer 49 via the input/output section 55 as well as to the RAM 58 so as to be stored in the image memory of the RAM 58 in the form of image data.

The servomotor 61, which drives the irradiation position adjustment mechanism 65, is connected to the computer 49 via a servo controller 60 having a signal processor and a drive signal output section. A counter 63 counts an output from the PG 62 and inputs the count data to the servo controller 60 as information about the current position of the laser beam LB. The computer 49 analyzes the image data obtained through image capturing and calculates the position of the chip joint face 3*s* (FIG. 3).

The position (edge position) of the chip joint face 3*s* can be determined in the following manner: a captured image is compared with a master image, which is an image of a center electrode including the outline of the chip joint face and is prepared beforehand so as to retrieve matching portions; on the basis of the retrieval results, the edge position is determined. Since an edge detection method that employs such pattern matching is known, detailed description thereof is omitted. As shown in FIG. 4, several master images are stored in storage unit 59, each being an image of a center electrode including the outline of a chip joint face prepared for spark plug workpieces W for different models (model numbers). When models of the spark plug workpieces W to be processed are changed, a master image corresponding to a relevant model may be selected. Thus, the spark plug workpieces W of different models can be handled by the same manufacturing apparatus 300, enabling efficient manufacture.

The thus-calculated chip joint face position is stored in the chip joint face position memory of the RAM 58. The storage unit 59 including an HDD contains, as a control parameter, the laser beam LB irradiation position δ represented by a distance from the chip joint face 3*s* in the direction of the axis O. The computer 49 reads a control parameter corresponding to a relevant model number (and loads the read control parameter into the control parameter memory of the RAM 58) to thereby obtain the value of the corresponding irradiation position δ, and arithmetically determines the movement target position for the laser beam LB (the laser beam irradiation unit 200) by use of the value of the irradiation position δ and the previously calculated value of the chip joint face position. The computer 49 outputs the thus-determined movement target position to the servo controller 60. While referring to an output from the counter 63 (the PG 62), the servo controller 60 causes the servomotor 61 to operate according to a predetermined drive pattern so as to move the laser beam LB to the movement target position.

The computer 49 executes a control/analysis program stored in the ROM 57, while using the work area of the RAM 58. The above-described practice employs open-loop control, in which after the movement target position is outputted to the servo controller 60, the result of the movement is not fed back to the computer 49. However, closed-loop control may also be employed, in which information about the current position of the laser beam LB output from the counter 63 is fed back to the computer 49, and the laser beam irradiation unit 200 is caused to continue moving until the fed-back position matches a set movement target position.

Next, the position of the chip joint face 3*s* can be detected after the noble metal chip 31' is attached to the chip joint face 3*s*. However, since the chip 31' and the center electrode 3 have a similar metallic gloss, accuracy in identifying the chip joint face 3*s* on an image may drop, and employment of detection before attachment of the noble metal chip 31' to the chip joint face 3*s* can enhance the accuracy of position detection. In this case, if detection of the position of the chip joint face 3*s* and relative positioning of the laser beam irradiation unit 200 and the center electrode 3 are performed before the noble metal chip 31' is attached to the chip joint face 3*s*, the subsequent welding step will be able to be started immediately after the noble metal chip 31' is attached to the chip joint face 3*s*. Thus, this practice is advantageous for enhancement of process efficiency.

The previously mentioned employment of a fixed reference position is effective for simplification of a process for detecting the position of the chip joint face 3*s*. Specifically, the practice described below is more effective. As shown in FIGS. 5(*a*) and 5(*b*), the chip joint face 3*s* of the center electrode 3 is pressed, in the direction of the axis O, against a positionally fixed positioning face 80*a* of a positioning member 80, thereby preliminarily holding the spark plug workpiece W. According to the present embodiment, the spark plug workpiece W is held upright by means of a holder 83 provided on an elevating table 84. An air cylinder 82 causes the elevating table 84 to rise so as to press the spark plug workpiece W against the positioning face 80*a*, thereby positioning the spark plug workpiece W. The position of the chip joint face 3*s* as viewed along the direction of the axis O is fixed at all times by means of the positioning face 80*a*, thereby serving as a fixed reference position.

As shown in FIG. 5(*c*), the spark plug workpiece W is chucked while being retained at the preliminarily held position. The chucked spark plug workpiece W undergoes detection of the position of the chip joint face 3*s*. On the basis of the detected position, the position of irradiation with a laser beam is adjusted. According to the present embodiment, a chuck 81 chucks the metallic shell of the spark plug workpiece W; as shown in FIG. 5(*d*), the elevating table 84 is lowered so as to cause the holder 83 to retreat from the spark plug workpiece W, and while being retained at the position with respect to the direction of the axis O, the chucked spark plug workpiece W is transferred to the laser beam irradiation position. Herein, the preliminarily held spark plug workpiece W is directly chucked by means of the chuck 81.

In order to meet a certain production line requirement, a different chucking practice described below may be employed. A preliminarily held spark plug workpiece is chucked by means of an intermediate chuck (needless to say, the preliminarily held position with respect to the direction of the axis O is retained). The intermediately chucked spark plug workpiece is then chucked by means of a major chuck. Intermediate chucking may be performed in two or more stages. Intermediate chucking of a spark plug workpiece may involve a positional deviation in the direction of the axis O. However, such a positional deviation can be rendered less influential by means of the following practice: the position of the chip joint face is detected while the spark plug workpiece is chucked by means of the main chuck, and, on the basis of the detected position, the position of irradiation with a laser beam is adjusted.

As shown in FIG. 6, the above-described method allows the spark plug workpieces W1 and W2 of different models having different lengths in the direction of the axis O to share the same positionally fixed positioning face 80*a* of the positioning member 80. Thus, when the spark plug workpieces W of different model numbers are to be processed on the same line, there is no need to change the position of the positioning face 80*a*, i.e., the reference position, in accordance with model numbers of the spark plug workpieces W, thereby making the process control efficient and easy.

FIGS. 7(*a*) to 7(*c*) show the spark portion 31 and a neighboring portion of a spark plug as manufactured by the above-described method. The full-circled laser-beam weld metal portion 10 having the weld metal portion depth (penetration depth) d and the weld metal portion width w as shown in FIGS. 7(*b*) and 7(*c*) is formed along the circumferential direction of the noble metal chip 31' in such a manner as to intrude into the noble metal chip 31' and into a diameter-reduced distal end portion of the center electrode 3 having the tapered surface 3*t* and in such a manner as not to reach the discharge face 31*a* with respect to the thickness direction of the noble metal chip 31'. As a result of formation of the full-circled laser-beam weld metal portion 10, the spark portion 31 having the discharge face 31*a* is formed on the noble metal chip 31', and the spark portion thickness h is the shortest distance as measured along the direction of the axis O between the peripheral edge of the discharge face 31*a* and the corresponding end edge of the full-circled laser-beam weld metal portion 10.

When H represents the height of the noble metal chip 31' as viewed along the direction of the axis O, as mentioned previously, in view of attainment of sufficient joining strength, enhancement of separation resistance, and increase of service life with respect to the spark portion 31, d/w is adjusted to greater than 0.35 and not greater than 1, and h/H is adjusted to not less than 1/3 and not greater than 9/10. In this case, preferably, the full-circled laser-beam weld metal portion 10 is adjusted such that the melt ratio of the metal of the noble metal chip 31' is 40%–60% by volume; and the laser beam irradiation position δ on the chip-attached assembly 170 is adjusted such that the melt ratio falls within the range.

According to the studies conducted by the inventors, the form of the weld metal portion 10 varies with the position of irradiation with the laser beam LB as shown in FIG. 8. Specifically, when the position of irradiation with the laser beam LB is varied along the direction of the axis O, as shown in FIG. 8(*a*), the weld metal portion depth d assumes the maximum value d0 at a certain position of irradiation (hereinafter referred to as the "maximum depth position"; in FIG. 8, the position of the chip joint face 3*s* is the maximum depth position, which is not necessarily the case at all times). When, as shown in FIG. 8(*b*), the irradiation position is biased into the center electrode 3 with respect to the irradiation position of FIG. 8(*a*), the weld metal portion depth dL decreases as compared with d0, and the spark portion thickness hL increases as compared with h0, where h0 represents a spark portion thickness corresponding to the maximum depth position. As shown in FIG. 8(*c*), when the irradiation position is biased into the chip 31' with respect to the irradiation position of FIG. 8(*a*), the weld metal portion depth d' decreases as compared with d0 as in the case of FIG. 8(*b*), but the spark portion thickness hU decreases as compared with h0. In FIGS. 8(*a*)–8(*c*), the noble metal chips 31' are of the same material, and the center electrodes 3 are of the same material.

FIG. 11 shows the above-mentioned relationship as measured under the following conditions: the output condition of the laser beam LB is fixed; the center electrode 3 formed from INCONEL600 is used; and chip materials are Pt-13% mass Ir, Ir-20% by mass Ru, Ir-5% by mass Pt, and Ir-5% by mass $Y_2O_3$. The chick thickness H is 0.6 mm, and the chip diameter D is 0.8 mm. As is apparent from FIG. 11, the relationship between the laser beam irradiation position δ and the weld metal portion depth d or the relationship between the laser beam irradiation position δ and the spark portion thickness h varies with chip material or electrode material. Information about these relationships is experimentally obtained beforehand. On the basis of the obtained experimental information, the irradiation position that brings d/w or h/H into the previously mentioned range is obtained for use in actual manufacture. In this case, the melt ratio of the chip metal in the weld metal portion 10 to be formed falls within the previously mentioned range.

As shown in FIG. 7(*b*), when the full-circled laser-beam weld metal portion 10 is radially discontinuous (in this case, the full-circled laser-beam weld metal portion 10 assumes a ring-like shape), the chip thickness H and the penetration depth d may be actually measured after welding on a section including the axis O (hereinafter referred to as the "axial section"). However, as shown in FIG. 7(*a*), when the full-circled laser-beam weld metal portion 10 is radially continuous (the full-circled laser-beam weld metal portion 10 assumes a disk-like shape), the chip thickness H and the penetration depth d cannot be measured after welding on the axial section. However, the penetration depth d can be the chip radius assuming that, on the axial section of the full-circled laser-beam weld metal portion 10, the full-circled laser-beam weld metal portion 10 is symmetrical with respect to the axis O. The thickness H of the chip is obtained as described below, assuming that the full-circled laser-beam weld metal portion 10 is a fused alloy portion in which the metal of the noble metal chip and the metal of the center electrode are homogeneously distributed along the circumferential direction.

First, assuming that the metal composition of the noble-metal spark portion 31 and that of the center electrode 3 (a chip joint face (3*s*) formation portion) are known, as shown in FIG. 9, C represents the main component of the noble-metal spark portion 31; NC (% by mass) represents the content of component C; E represents the main component of the center electrode 3; and NE (% by mass) represents the content of component E. Next, on the axial section of the noble-metal spark portion 31, average contents NCW and NEW of components C and E, respectively, in the full-circled laser beam weld metal portion 10 are obtained by a microanalysis such as EPMA or EDX. When x represents the melt ratio of the noble metal chip in the weld metal portion 10, the relationship represented by (1) in FIG. 9 holds; therefore, x can be obtained as represented by (2) in FIG. 9. Herein, the volumetric melt ratio of the noble metal chip in the weld metal portion 10 is approximated by (x/ρC)/{(x/ρC)+(1−x)/ρE} (the thus-obtained value multiplied by 100 yields a value in % by volume), where ρC ($g/cm^3$) represents the density of component C at room temperature, and ρE ($g/cm^3$) represents the density of component E at room temperature. This method for determining the volumetric melt ratio of the noble metal chip also applies to the case of FIG. 7(*b*) where the full-circled laser-beam weld metal portion 10 is radially discontinuous.

Next, the volume of the weld metal portion 10 is obtained as described below (see FIG. 10). The weld metal portion 10 is divided at infinitesimal distances Δz along the direction of the axis O by means of planes that perpendicularly intersect the axis O (thus-obtained sections are hereinafter called cross sections). Increasing the number of divisions reduces error; however, for example, 100 divisions or so will suffice. Cross-sectional area Si of the weld metal portion 10 (Si represents the area of a cross section yielded through cutting of the weld metal portion 10 by the i'th intersecting plane as counted from the chip side; the same convention also applies to Si') can be approximated by the area of a circle whose diameter is equal to the length of a portion of the i'th intersecting plane extending across the weld metal portion 10 on the axial section of FIG. 10. In the case where the i'th intersecting plane extends across the upper or lower recess of the weld metal portion 10, a portion of the i'th intersecting plane extending across the weld metal portion 10 appears on opposite sides of the axis O. In this case, cross-sectional area Si is approximated by the area of a ring-shaped domain whose inner diameter is equal to the distance between inside intersections of the weld metal portion 10 and the i'th intersecting plane and whose outer diameter is equal to the distance between outside intersections of the weld metal portion 10 and the i'th intersecting plane.

Volume Vt of the weld metal portion 10 can be calculated, according to quadrature by parts, as the sum of volumes of thin columns each having a bottom area equal to cross-sectional area Si and a height equal to infinitesimal distance Δz (Eq. (3) in FIG. 10). Since the volumetric melt ratio of the noble metal chip 31' is already calculated by (x/ρC)/{(x/ρC)+(1−x)/ρE}, the melt volume of the noble metal chip 31' and the melt volume of the center electrode 3 can be calculated from volume Vt by Eq. (4) and Eq. (5), respectively, in FIG. 10.

When t represents the spark portion thickness, and tA represents the distance along the direction of the axis O between an end edge of the weld metal portion 10 and the presumed position of the chip joint face 3*s*, presumed chip thickness H is represented by h+tA. Volume Vr of the recess of the weld metal portion 10 located on the chip (spark portion) side can be calculated, according to quadrature by parts, by Eq. (6) in FIG. 10, where Si' represents a cross-sectional area approximated by the area of a domain surrounded by the inner circumferential edge of the above-mentioned ring-shaped domain. Thus, when D represents the chip diameter, and h represents the spark portion thickness, presumed chip volume Vm is represented by Eq. (7) in FIG. 10. Therefore, presumed chip height H can be obtained by Eq. (8) in FIG. 10. These arithmetic operations can be performed quickly and accurately by use of a computer. Specifically, an observed image corresponding to the above-mentioned axial section is captured, and the captured image is subjected to known image data processing by use of a computer.

While the invention has been described hereinabove with reference to a particular embodiment, the invention is not limited thereto. The above-described embodiment is a mere example, and the invention may be embodied in various other forms without departing from the scope of the invention.

For example, the above embodiment as described uses a single laser beam irradiation unit. However, in order to enhance efficiency, a plurality of laser beam irradiation units may be arranged around the axis O for subjecting a single spark plug workpiece to simultaneous welding effected by the laser beam irradiation units. In this case, adjustment of the laser beam irradiation position on the basis of the detected position of a chip joint face can be performed for each of the laser beam irradiation units.

What is claimed is:

1. A method for manufacturing a spark plug, comprising:

attaching a noble metal chip on a joint face formed on a distal end of a center electrode so as to form a chip-attached center electrode of a spark plug;

detecting a position of the chip joint face along a longitudinal axis of the chip attached center electrode;

positioning a laser beam on the chip-attached center electrode on the basis of the detected position;

adjusting a position of the laser beam in a direction of an axis of the center electrode, based on a relationship between a composition of the noble metal and a composition of the center electrode; and, irradiating a laser beam to said adjusted position of the laser beam so that the noble metal chip is welded to the distal end of the center electrode.

2. A method for manufacturing a spark plug as described in claim 1, wherein the position of the chip joint face is detected by capturing an image of a portion of said center electrode including said chip joint face, and determining the position of said chip joint face on the basis of the captured image.

3. A method for manufacturing a spark plug as described in claim 2, wherein said image is captured using an image pickup unit having an optical axis substantially in parallel with said chip joint face (3*s*).

4. A method for manufacturing a spark plug as described in claim 1, wherein adjustment of the position of irradiation with said laser beam is performed through relative movement of a laser beam irradiation unit and said center electrode in the direction of the longitudinal axis.

5. A method for manufacturing a spark plug as described in claim 4, wherein adjustment of the position of irradiation with said laser beam is performed through movement of only said laser beam irradiation unit in the direction of the longitudinal axis.

6. A method for manufacturing a spark plug as described in claim 4, wherein detection of the position of said chip joint face and determination of relative position between said laser beam irradiation unit and said center electrode are performed before said noble metal chip is attached to said chip joint face.

7. A method for manufacturing a spark plug as described in claim 1, wherein detection of the position of said chip joint face is performed before said noble metal chip is attached to said chip joint face.

8. A method for manufacturing a spark plug as described in claim 1, wherein said spark plug workpiece is preliminarily held such that the chip joint face is pressed, in the direction of the longitudinal axis, against a positionally fixed positioning face of a positioning member, said spark plug workpiece being chucked while being retained at the preliminarily held position, and said chucked spark plug workpiece being subjected to adjustment of the position of irradiation with said laser beam.

9. A method for manufacturing a spark plug as described in claim 8, wherein the position of said fixed positioning face is set in common among spark plug workpieces of different lengths along the direction of the longitudinal axis.

* * * * *